Aug. 13, 1968   J. H. BOYDEN ET AL   3,397,024
OPTICAL PRISM FOR USE IN BEAM DIVERGENCE REDUCING APPARATUS
Filed Sept. 1, 1964

INVENTORS
JAMES H. BOYDEN
MILTON LAIKIN

*Elliott & Pastoriza*
ATTORNEYS

United States Patent Office 3,397,024
Patented Aug. 13, 1968

3,397,024
OPTICAL PRISM FOR USE IN BEAM DIVERGENCE REDUCING APPARATUS
James H. Boyden, Granada Hills, and Milton Laikin, Los Angeles, Calif., assignors to Korad Corporation, a corporation of New York
Filed Sept. 1, 1964, Ser. No. 393,615
3 Claims. (Cl. 350—199)

ABSTRACT OF THE DISCLOSURE

A beam divergence reducing apparatus is provided for a laser in the form of a corner reflecting prism having a concave face as an integral part thereof and a cooperating concave mirror of considerably larger diameter than the concave face on the prism. The corner reflecting prism is positioned to intercept the beam and through refraction pass the beam onto the larger concave reflecting mirror which is positioned coaxially with the laser to face the corner reflecting prism and reflect the radiation received therefrom to define a beam having a decreased angle of divergence compared to the original divergence angle of the laser radiation. By the use of the corner reflector with a concave face, the beam passed to the larger reflecting surface is effectively decreased in power density such that a large concave reflecting mirror may be employed without fear of damaging the mirror.

---

This invention relates broadly to optical prisms and more particularly to a novel optical prism for use in a beam divergence reducing apparatus wherein a light beam of extremely high power density is involved, such as provided in laser systems.

The output light beam from laser systems is characterized by its monochromatic and coherent nature resulting in a very small divergence of the beam. Thus, the coherent light is in the form of rays all parallel to each other and to the axis of the laser rod. However, as in the case of any optical system in which a theoretical point source cannot be realized, the beam has a definite divergence. Such beam divergence as occurs with ordinary sources of light can be reduced by conventional optical means. However, in the case of laser generated light, the power density of the light is of such magnitude that the attempted use of conventional primary reflecting surfaces can result in destruction of the mirror.

With the foregoing in mind, it is accordingly a primary object of this invention to provide a beam angle reducing system which is suitable for very high power densities as encountered in laser light beam systems.

More particularly, it is an object to provide a novel optical prism for use as an integral part of a beam divergence reducing apparatus which will effect the same result as a primary reflecting surface or convex mirror while avoiding the problems of absorption of the high power densities which would normally evaporate any metal film forming a conventional mirror.

Another more general object of this invention is to provide a beam divergence reducing apparatus which enables the use of a relatively large diameter concave mirror as a secondary reflecting surface forming the reduced divergence beam to the end that problems encountered with conventional type refracting convex lenses of large size and mass are avoided.

Briefly, these and many other objects and advantages of this invention are attained by providing a corner cube prism reflector having a concave front entrance surface as opposed to the conventional flat entrance surface. The device is thus equivalent to a concave lens but serves to effect a total internal reflection or reverse direction of the received beam. The device may also be considered equivalent to a convex mirror surface except that the properties of internal refraction characteristic of a corner reflector enables total reflection to be accomplished with negligible absorption.

A much larger diameter concave mirror is positioned in front of the prism in coaxial relationship therewith so that the virtual focus of the reflecting prism coincides with the focus of the concave mirror. Since the beam of light after reflection from the reflecting prism is spread over the entire area of the larger diameter concave mirror, the power density is reduced considerably so that a conventional metal reflecting surface may be employed on the concave reflector.

The divergence of the beam is reduced in the ratio of the respective focal lengths of the reflecting prism and large concave mirror and in a preferred embodiment wherein the total beam is reduced, the ratio of the diameter of the entrance concave surface of the reflecting prism to the diameter of the concave mirror positioned in front of the system corresponds to the ratio of the exit divergence angle of light to the entrance divergence angle of light so that by making the concave mirror of very large diameter, and thus of long focal length, a considerable beam divergence reduction can be realized.

A better understanding of the invention will be had by now referring to a specific embodiment thereof as illustrated in the accompanying drawings, in which.

Figure 1:
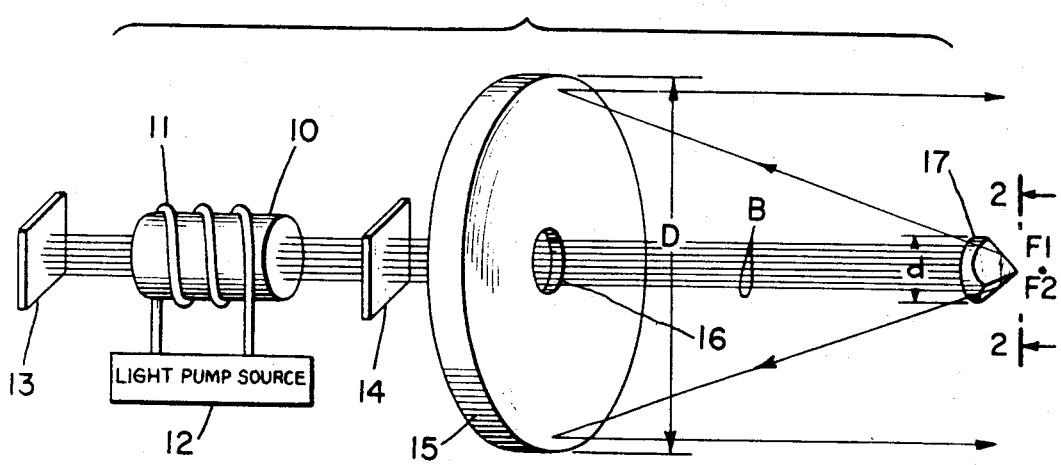
FIGURE 1 illustrates the apparatus for use in reducing beam divergence from a laser system.

Referring first to FIGURE 1, there is shown a laser system including a laser rod such as ruby 10 surrounded by a helical light pump 11 powered from a light pump source 12. Suitable regeneration means in the form of end mirrors 13 and 14 are illustrated at opposite ends of the laser rod 10 to define an optical cavity for stimulating emission of radiation.

The beam divergence reducing apparatus includes a concave mirror 15 having a central aperture 16 through which the laser beam B passes. An optical reflecting prism 17 is positioned along the beam axis as shown for receiving the beam and reflecting the beam onto the concave mirror 15. As indicated in FIGURE 1, the virtual focus of the optical prism 17 designated F1 is coincident with the focus F2 of the concave mirror 15. Further, the ratio of F1 to F2 corresponds to the ratio of the diameter $d$ of the prism 17 to the diameter D for the concave reflector 15, the smaller diameter $d$ corresponding substantially to the diameter of the laser rod 10.

Figure 2:
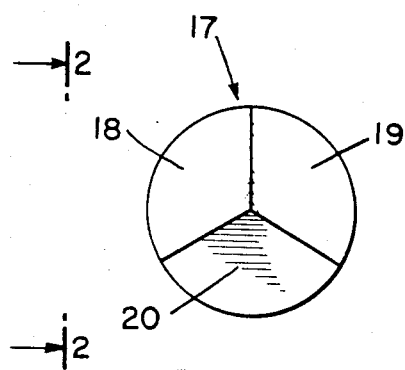
FIGURE 2 is a rear elevational view of the reflecting prism portion of the apparatus of FIGURE 1 looking in the direction of the arrows 2—2.
Figure 3:
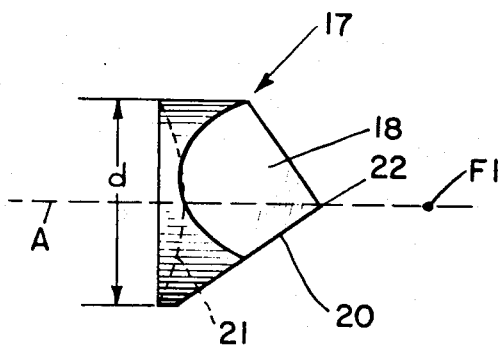
FIGURE 3 is a side elevational view taken in the direction of the arrows 3—3 of FIGURE 2; and, FIGURE 4 is a schematic diagram useful in describing the operation of the beam divergence reducing apparatus.

Referring now to FIGURES 2 and 3, details of the reflecting prism 17 will be described. As shown, the corner reflecting portion of the prism is defined by flat rear surfaces 18, 19 and 20 forming right angles with each other to define the corner of a cube. In FIGURE 3, the front surface 21 of the prism is shown as concave, the axis of this concave surface being designated A and constituting the optical axis of the prism. The axis A passes through the apex 22 of the rear surfaces 18, 19 and 20. The planes of the rear surfaces form equal angles with the axis A and since these surfaces are at right angles to each other to provide a corner reflector, any light passing into the prism through the front concave entrance surface 21 will be re-directed by total internal reflection out through the concave surface 21 so that the prism is in a sense equivalent to a concave lens.

The virtual focal point for the reflecting prism is at F1.

Figure 4:
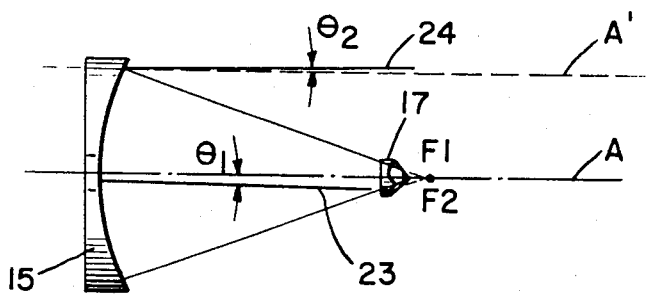

Referring now to FIGURE 4, the manner in which beam divergence reduction is achieved will be evident. In FIGURE 4, there is illustrated an entrance laser light ray or beam 23 diverging at an angle $\theta 1$ to the optical axis A. This light ray passes into the corner reflecting prism 17 and as a consequence of the concave entrance surface, will pass back through the surface at a refracted angle to the large concave mirror 15 from which it will be reflected as indicated at 24. The divergence of this reflected or exit light from the concave mirror 15 forms an angle $\theta 2$ with an axis A' which axis is parallel to the axis A. The entire system is afocal and with the focal points F1 and F2 coincident, the ratio of the angle $\theta 2$ to the angle $\theta 1$ is expresed as follows:

$$\theta 2/\theta 1 = \frac{\text{focal length of prism 17}}{\text{focal length of concave mirror 15}}$$

When the entire beam from tht laser rod 10 is to be reduced, the ratio of the angle $\theta 2$ to the angle $\theta 1$ is also given by the ratio: $d/D$.

As a specific example, by making the diameter of the concave mirror 15 twenty times the diameter of the concave entrance surface for the prism 17, the angle of divergence will be reduced by a factor of 20. Also, it will be evident that the power density of the beam striking the concave reflecting surface 15 will be 1/400 that of the power density entering the prism 17. This former power density is not sufficiently large to cause any harm to the reflecting surface 15. On the other hand, the high power density in the initial beam entering the prism 17 would be sufficient to destroy any type of conventional reflector employed at this point. Thus, the provision of the novel corner reflector with a concave entrance surface wherein total internal reflection is achieved with negligible absorption constitutes an important feature of the present invention.

From the foregoing description, it will thus be evident that there has been provided a greatly improved beam divergence reducing apparatus for high power density beams wherein a large concave secondary reflecting surface may be employed with an effective primary reflecting structure which does not rely on a conventional type reflecting mirror but rather takes advantage of the principles of a corner reflector.

What is claimed is:

1. An apparatus for reducing the beam divergence of a laser beam passing from a laser rod of given diameter, comprising, in combination: a reflecting prism having a concave light entrance front surface of a first diameter equal to said given diameter and flat rear surfaces defining a corner reflector, the axis along which said laser beam is directed coinciding with the optical axis of said prism, said optical axis being coincident with the axis of said concave light entrance surface and passing through the apex of said corner reflector, the planes of said rear surfaces forming equal angles with said optical axis; and a concave mirror of a second diameter greater than said first diameter positioned in spaced coaxial relationship in front of said prism so that its focus is coincident with the virtual focus of said prism, whereby the ratio of exit angle of light with respect to said axis leaving said concave reflector to the entrance angle of said light in said beam with respect to said axis received into said reflecting prism is equal to the ratio of the virtual focal length of said prism to the focal length of said concave mirror.

2. An apparatus according to claim 1, in which the ratio of said first given diameter to said second given diameter is equal to said ratio of said exit and entrance angles.

3. An apparatus according to claim 1, in which said concave mirror has a central aperture through which said entrance light in said laser beam passes.

References Cited

FOREIGN PATENTS 773,201    8/1934    France.
147,809        1962    U.S.S.R.

OTHER REFERENCES

Chang, "Lasers and Applications," published by The Ohio State University, Columbus, Aug. 1, 1963, pp. 224–234 relied on.

JOHN K. CORBIN, *Primary Examiner.*